FIG. I

INVENTOR.
HOWARD B. CUMMINGS
ATTORNEYS

INVENTOR.
HOWARD B. CUMMINGS
ATTORNEYS

March 14, 1967 H. B. CUMMINGS 3,309,072
RECUPERATOR TUBES

Filed June 4, 1962 4 Sheets-Sheet 3

INVENTOR.
HOWARD B. CUMMINGS
BY
ATTORNEYS

March 14, 1967 H. B. CUMMINGS 3,309,072
RECUPERATOR TUBES

Filed June 4, 1962 4 Sheets-Sheet 4

INVENTOR.
HOWARD B. CUMMINGS
BY
Ely, Pearne & Gordon
ATTORNEYS

United States Patent Office 3,309,072
Patented Mar. 14, 1967

3,309,072
RECUPERATOR TUBES
Howard B. Cummings, New Castle, Pa., assignor, by mesne assignments, to Shenango Ceramics, Inc., New Castle, Pa., a corporation of Delaware
Filed June 4, 1962, Ser. No. 199,692
4 Claims. (Cl. 263—20)

This invention relates to heat exchanger tubes, and, more particularly, to the construction of ceramic recuperator tubes of the type which are arranged in courses within a refractory recuperator chamber to form a vertical flue structure through which are directed the hot waste gases flowing from soaking pits, furnaces, kilns, or the like. The construction of the recuperator tubes of the invention is such as to obtain the optimum in heat exchange between the effluent waste gases and the influent air which is caused to flow in horizontal passes around the vertical flues, and, at the same time, obtain a structure which has the necessary strength to withstand the thermal shocks and stresses encountered and which also avoids blockages due to accumulated fly-ash.

In prior recuperators the most satisfactory cross-sections of the refractory ceramic tubes therefor have been polygonal (generally, octagonal), the theory being that, by such a cross-section one may obtain larger surface areas for heat transfer than with a cylindrical tube having an equivalent wall thickness strong enough to withstand the thermal shocks and temperature differences encountered. Even so, such tubes will crack in use and, because of the practice of joining lengths of them by refractory cement, fly-ash, when present, would tend to collect at the joints. To counter these defects, the trend has been to increase the wall thickness and to take great pains and time in cementing the joints to avoid dust-collecting joints. These expedients, of course, increased the weight and cost of the tubes and recuperators, and, as this invention has demonstrated, were actually self-defeating by decreasing the rate of heat transfer.

It is the object of this invention to provide ceramic refractory recuperator tubes which substantially increase the rate of heat transfer between the gases contacting the internal and external surfaces of the tube, which are lighter in weight than prior art tubes having an internal passageway of equal cross-sectional area, and yet which are less subject to breakage from thermal strain.

Another object and advantage of this invention is to provide ceramic recuperator tubes and joining means therefor which may be substituted in recuperators built and adopted to use conventional octagonal tubes but which may be cemented and sealed together quickly and simply without providing ledges or joints likely to collect fly-ash or dust.

Other objects and advantages of the invention will become apparent as the same become better understood when considered in connection with the following detailed description and accompanying drawings wherein.

Figure 1:
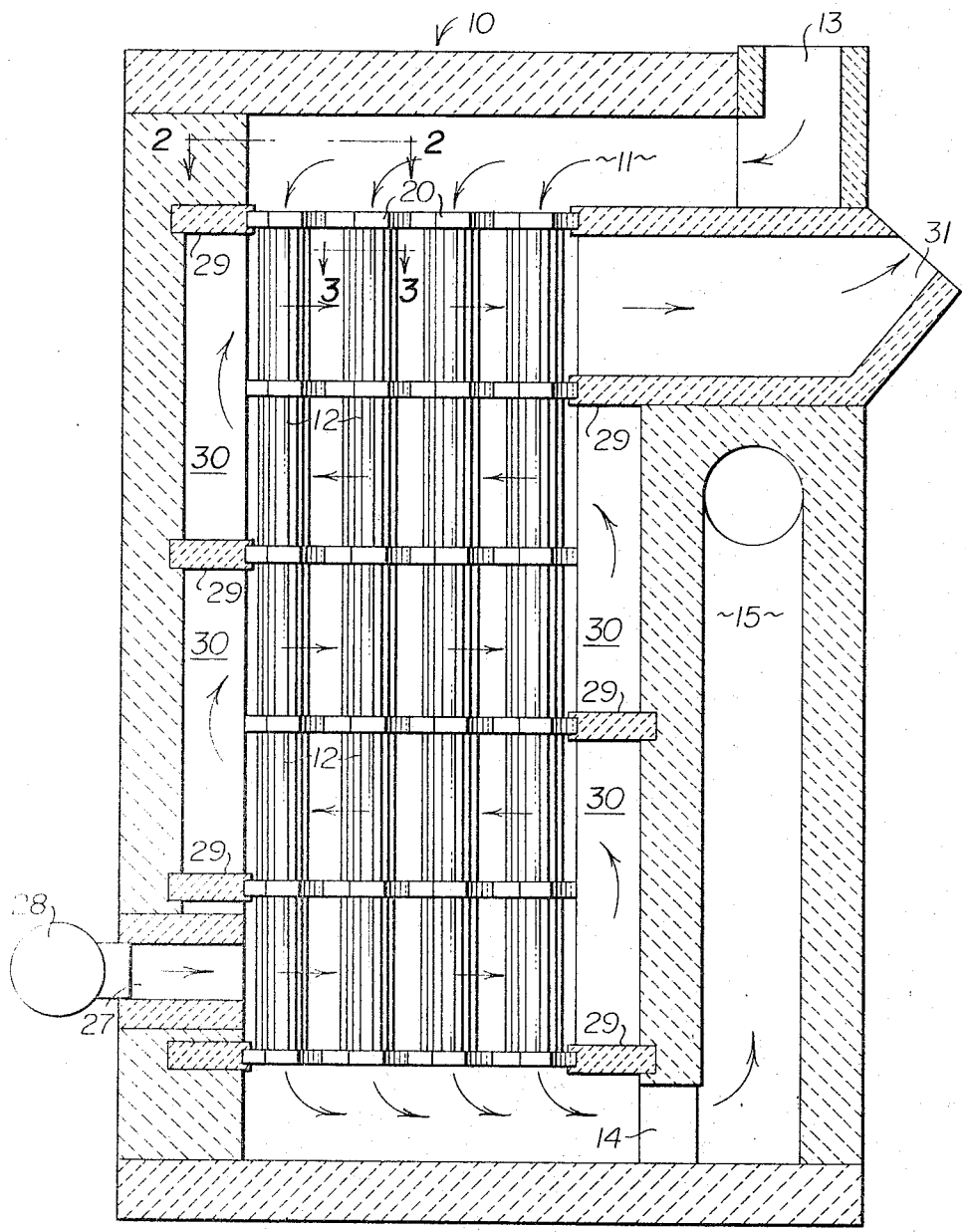
FIGURE 1 is a vertical section of an exemplary recuperator chamber showing use of recuperator tubes constructed according to this invention.

Referring to the drawings, FIGURE 1 shows a typical recuperator structure 10 having heat insulating walls which define a recuperator chamber 11. A plurality of refractory ceramic recuperator tubes 12 made according to this invention are vertically aligned in the chamber 11 to form a plurality of flue passages.

The top of the recuperator structure 10 is formed with a passage 13 through which are drawn the hot waste gases from a soaking pit, kiln, or furnace. This passage 13 acts as a manifold for the vertical flue passages, defined by the tube 12, leading to the bottom of the chamber 11. The bottom of the recuperator chamber has a port 14 connected to a passage 15 which leads to a stack or to additional heat recuperating structures.

The recuperator chamber 11 is divided into connected horizontal courses by flue blocks 20. The flue blocks are shown as being octagonal in shape and are preferably the same size as conventional blocks to permit replacement and substitution in existing structures using conventional octagonal tubes and blocks. However, these flue blocks 20 are each provided with an upper recess 21 and a lower recess 22 between which is an inwardly extending flange 23. The inner surfaces of the flanges 23 are corrugated to conform with the inner profile of the recuperator tubes 12 to provide a substantially continuous smooth inner surface for the flue passages and thereby avoid burning-out the blocks by the build-up incrustations of fly-ash at the joints of the several tubes. When assembled, the flue blocks are cemented together, and center blocks 24, corner blocks 25, and edge blocks 26 are inter-arranged among the flue blocks 20 in the customary manner, as indicated in FIGURE 2, to complete a horizontal course of the several filling the recuperator chamber.

Air to be heated enters the bottom of the recuperator chamber 11 through the passage 27, there being a blower 28 provided at the entrance to passage 27 to regulate the volume of air supplied. Baffle blocks 29 are staggered in the passages 30 located in the recuperator chamber at opposite sides of the courses of tubes and blocks for the purposes of directing the air horizontally past the successive courses of recuperator tubes so that the air is heated thereby. When the heated air reaches the top of the recuperator chamber in the manner described, it is discharged through a passage 30 into a furnace or soaking pit or the like.

The key to the successful operation of a recuperator, such as the example described, lies in the configuration of the tube 12. As most clearly shown in cross-section in FIG. 3, the wall 32 of the tube 12 is of substantially equal thickness but deeply corrugated. In the preferred embodiment disclosed, the depth of such deep corrugations is at least greater than the wall thickness of the tubes, and where the corrugations are re-entrant, the radius of the corrugation is not greater than the wall thickness. It has been found that by such corrugations, the total mass of a tube having adequate strength to support succeeding courses in the recuperator may be one-third the weight of uncorrugated cylindrical or polygonal tubes providing an internal passageway of equal cross-sectional area and, thus, of equal capacity. In addition to reduction in weight and cost of material, the configuration permits sufficient expansion and contraction of the tubes to lessen thermal stresses. The external corrugations cause turbulence and increased impingement velocities of the air to be heated, thereby increasing the rate of heat transfer. The greater heat transfer due to the combination of the thinner permissible wall thickness and the increased rate of heat transfer results in an improvement of total thermal conductivity over that of a conventional tube by as much as 100 percent.

Figure 2:
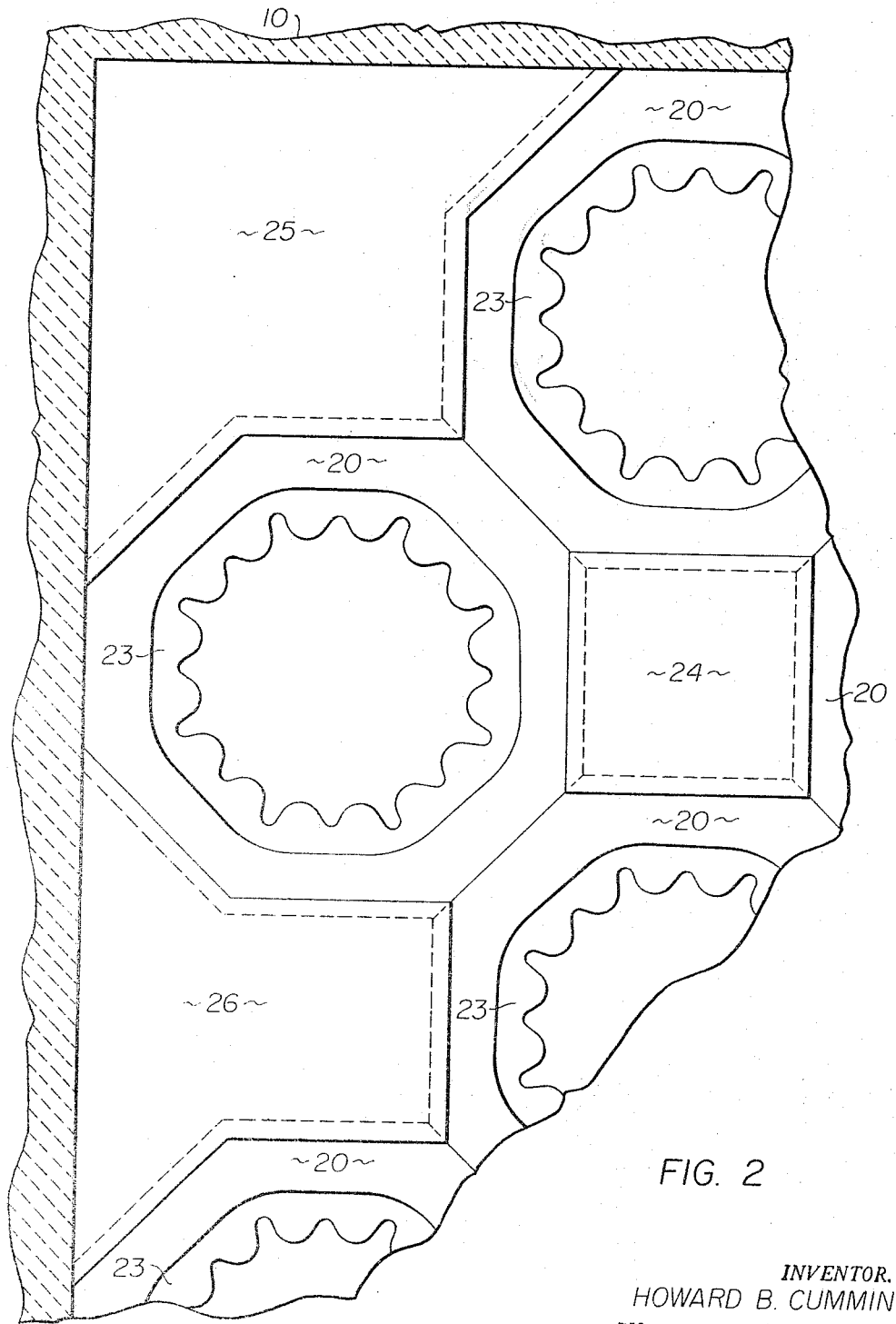
FIGURE 2 is a fragmentary plan view, partially in section, taken along the line 2—2 of FIGURE 1.
Figure 3:
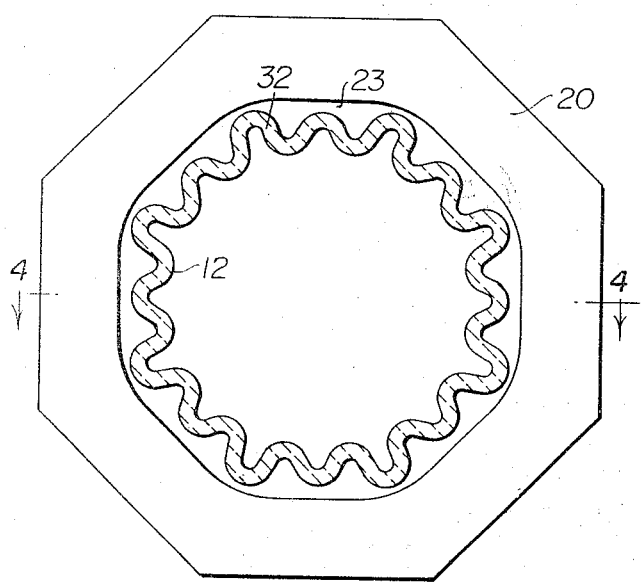
FIGURE 3 is a horizontal cross-section of a recuperator tube and an associated flue block constructed according to the invention.
Figure 4:
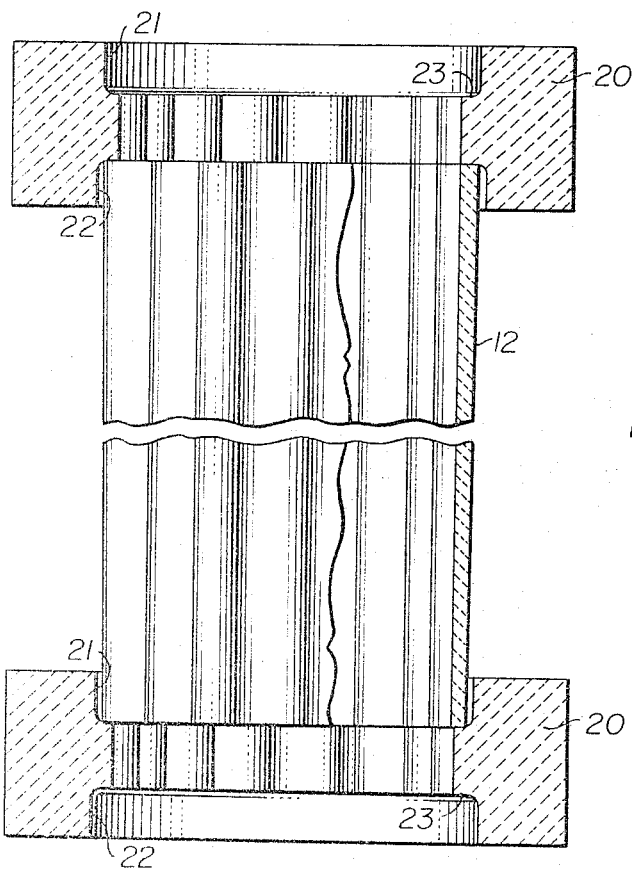
FIGURE 4 is a detail vertical sectional view, showing a tube partly in elevation and partly broken away, taken along the line 4—4 of FIGURE 3.

As shown in FIGS. 2 and 3, the profile (in plan) of the corrugated tube 12 shows the corrugations arranged so that the over-all configuration is octagonal. Thus, the tubes, by their fit in the filleted octagonal recesses 21 and 22 in the flue blocks 20, are held against substantial rotation with respect to each other and their corrugations are held in substantial alignment during assembly and use. To maintain the alignment of the corrugations and the consequent substantial continuous and smoother inner surface, free of any substantial ledges or recesses where dust or fly-ash might accumulate, and to seal the tubes against contaminating leakage of flue gases into the air being heated, the spaces between the walls of the recesses 21 and 22 and the adjacent corrugated outer surfaces of the tube 12 may be packed during assembly with refractory fibers or cement.

Figure 5:
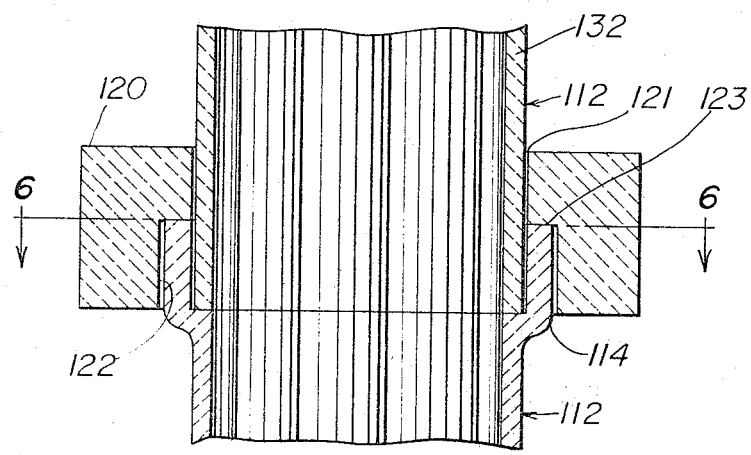
FIGURE 5 is a vertical sectional corresponding to the upper portion of FIGURE 4, but showing a modified joint between lengths of recuperator tube made according to this invention.
Figure 6:
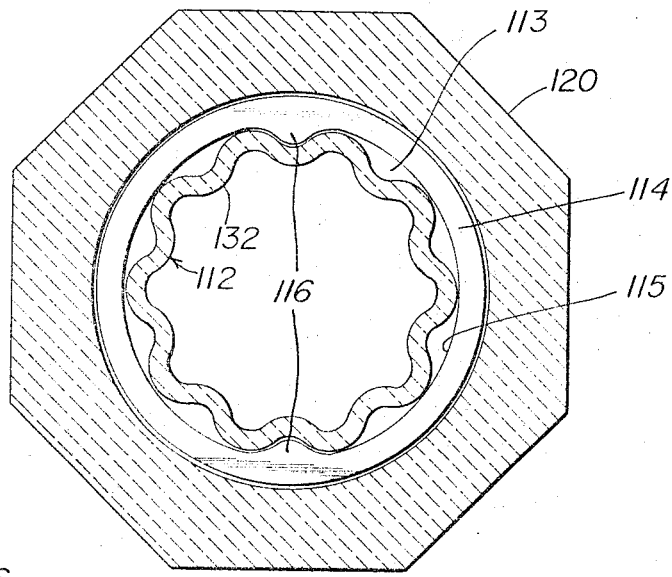
FIGURE 6 is a horizontal section along the line 6—6 of FIGURE 5.

FIGS. 5 and 6 show a modification of the tubes permitting easier assembly of the tubes and flue blocks and a minimization of the joints between assembled tubes and, therefore, a lessening of the opportunity for fly-ash to accumulate in the assembled recuperator tubes. As shown in this modification, the tubes 112 are provided with a constant wall thickness 132, corresponding to the tube 12 and its corrugated wall 32 of the embodiment shown in FIGS. 1 to 4. In this alternate embodiment, however, the over-all cross section of the tube 112 is generally circular, rather than octagonal, but otherwise it is deeply corrugated. In the specific embodiment 112 as shown, the number of corrugations (relative to the diameter) in the wall 132 are less than those in the wall 32 of the tube 12, but the configuration of such corrugations conforms to the meaning of the term "deeply corrugated" as used in this specification and the appended claims, namely, the depth of the corrugation (i.e., the difference between the maximum outside radius of the tube at the outermost portion of a corrugation and the minimum outside radius at the innermost portion of a corrugation) is at least greater than the wall thickness of a tube and, where the corrugation is re-entrant, the radius of the re-entrant surface is not greater than the wall thickness.

One end of the corrugated tube 112 is formed with a bell 114 to provide a ledge 113, formed by the expanded inner wall surface 115 of the bell 114 and the corrugated inner wall surface of the tube 112. Except for the splines 116, the inner wall surface 115 of the bell is a cylindrical surface fitting against the outermost corrugations of the spigot (i.e., unexplained) end of a tube 112 received in the bell. One or more splines 116, integral with the inner wall surface 115 and contoured to mate with a re-entrant corrugation in the spigot end of a tube 112, key the bell and spigot ends of joined tubes 112 against rotations with respect to each other and, thereby hold the internal corrugations of joined tubes in alignment during assembly and use. To seal the joined tubes 112 against leakage through the joint, suitable refractory fibers or a cement is packed in the spaces between the corrugation of the spigot end of one tube 112 and the inner wall surface 115 of the bell end of a joined tube.

To provide horizontal courses within the recuperator, the lowermost course of flue blocks is formed with an internal flange similar to the flange 23 in the flue block 20 against which the spigot end of a tube 112 will rest. The remaining flue blocks 120 are preferably provided with a central inner bore 121 circumscribing and loosely fitting the spigot end of a tube 112 and an enlarged counter-bore 122 fitting the bell of a tube 112, the difference in diameters of the bore and counter-bore providing an annular ledge 123 permitting the flue block 120 to rest on the end of a bell 114. In the uppermost course of flue blocks 120, the space between a ledge 113 and the upper surface of an associated flue block may be filled with a spigot end cut off a corrugated tube 112, but preferably the ledge 113 is simply filleted with refractory cement.

In addition to providing a single joint between connected tubes 112, the modification shown in FIGS. 5 and 6 also permits a sealed joint while allowing the tubes and flue blocks to float with respect to each other within the limits permitted by the fit of the bell and spigot joint of the tubes 112 within the bore and counter-bore of the flue block 120.

In both of the embodiments disclosed, the flue blocks are shown as being octagonal in plan in order that tubes made according to this invention, with their associated flue blocks, may replace the relatively conventional octagonal tubes and flue blocks in the existing recuperator in case it is desired to renovate existing structures gradually as the existing tubes fail in use. Such blocks 20 or 120 are also used when the spacing of existing supports for the assembled tubes and flue blocks (not shown) in an existing recuperator structure 10 requires the use of octagonal flue blocks, as shown, even if the entire assemblage of tubes and flue blocks is to be replaced. However, when a recuperator is being built new, or being rebuilt to provide supports for the most efficient arrangement of tubes made according to this invention, or the arrangement of supports in existing structures otherwise permits or requires, the configuration, in plan, of the flue blocks 20 or 120 may be of any suitable polygonal shape to close off the stacks of tubes into courses transverse to the assembled lengths of tubes.

As will be appreciated by those skilled in the art, the tubes made according to this invention may be formed by extrusion of a body of unfired refractory ceramic material in a plastic condition or by casting a slip, comprising a suspension of ceramic particles in a liquid, in plaster or other absorptive molds. Both to minimize the collection of fly-ash and provide strength against fracture due to thermal stresses, the corrugated surface of a tube, after firing, should be a smooth and uniformly dense fusion of ceramic particles substantially free of voids and scratches. Such surface defects may initiate fracturing as the corrugations flex during thermal expansion and contraction. Thus, especially if the tubes are to be formed by extrusion, the refractory particles, prior to formulation of the plastic mass to be extruded, should be carefully screened to eliminate coarse particles which might otherwise be caught by the extrusion dies and form scratches in the extruded tube.

This invention, accordingly, is not to be limited to the specific embodiments shown but, instead, may be varied by those skilled in the art within the scope of the appended claims without departing from the scope and spirit thereof.

What is claimed is:

1. A refractory ceramic recuperator tube having a deeply corrugated wall of substantially uniform thickness and extending parallel to the tube axis throughout the major portion of its length to a spigot end, an integral bell formed at the opposite end of the tube, the inner wall surface of the bell being of a diameter sufficient to fit the spigot end of a similar tube, and detent means carried on the inner wall of said bell to fit in the corrugations of a spigot end received therein to key the corrugations of the internal surfaces of joined tubes into alignment.

2. A refractory ceramic recuperator tube as defined in claim 1 in which a surface transverse to the axial length of said tube joins the inner corrugated wall surface of the major portion of the length of the tube and the inner wall surface of the bell, said transverse surface being adapted to mate with a transverse end surface of the spigot end of a similar tube received in said bell, whereby lengths of said tubing may be assembled to provide an assemblage having a substantially continuous inner corrugated surface free of substantial protrusions or recesses upon and on which dust and fly-ash in gases passed therethrough could otherwise collect.

3. A recuperator structure comprising assemblages of tubes as defined in claim 2 in which the inner wall surfaces of the bell ends of said tubes, except for the integral detents formed thereon, and the re-entrant corrugations of the spigot ends of tubes received in said bell end define spaces at the joints between said tubes to permit a refractory sealant to be packed in said spaces, a plurality of flue blocks at the bell and spigot joints thereof and assembled with said tube assemblages to define substantially parallel courses transverse to said assemblages held in substantial parallelism by said blocks, said flue blocks being provided with a bore and counter-bore loosely fitting, respectively, the spigot and bell of tubes joined at said flue blocks, whereby said tube assemblages are sealed against leakage but are free to float under thermal expansion and contraction with respect to said flue blocks within the limits permitted by the fit of said bores and counter-bores of said flue blocks with respect to said joints.

4. In a recuperator structure of the type described, a heat-exchanging structure comprising a plurality of horizontal courses, said courses being formed in part by refractory flue blocks, each of said flue blocks having a bore and an inwardly directed flange within said bore, said flange defining upper and lower recesses in said flue block, and a plurality of refractory ceramic recuperator tubes, each of said tubes having its lower end disposed in an upper recess in one of said flue blocks and its upper end in a lower recess of another of said flue blocks, and means formed on the inner and outer surface of each recuperator tube for causing turbulence in the air flowing past said outer surface and relatively unobstructed flow of the gas flowing within said tube, said means formed on the inner and outer surface of each tube being complementary corrugations which form an undulated wall section extending substantially the axial length of said tubes between said courses, said upper ends of said tube are enlarged to provide a bell portion and the corrugations in the wall sections of said tubes continue axially to the lower ends of said tube to provide a spigot portion in which the inwardly directed flange in each bore of said flue blocks constitutes a ledge formed by a counter-bore of a different diameter from the diameter of said bore, said bore and counter-bore being of diameters sufficient to receive, respectively, the bell and spigot ends formed in the ends of corrugated refractory tubes and joined thereby.

References Cited by the Examiner

UNITED STATES PATENTS

| | | | |
|---|---|---|---|
| 783,886 | 2/1905 | Niemeczek | 126—118 |
| 1,657,704 | 1/1928 | Westcott | 263—20 |
| 1,743,830 | 1/1930 | Parker | 263—20 X |
| 1,771,160 | 7/1930 | Chapman | 263—20 |
| 2,733,908 | 2/1956 | Graham | 263—20 |

FOREIGN PATENTS 597,898 12/1925 France.
803,115 6/1936 France.

FREDERICK L. MATTESON, JR., *Primary Examiner.*

JOHN J. CAMBY, CHARLES SUKALO, WILLIAM F. O'DEA, *Examiners.*